United States Patent [19]

Schroeder

[11] Patent Number: 5,647,831
[45] Date of Patent: Jul. 15, 1997

[54] METAL PART AND PROCESS FOR ITS PRODUCTION

[76] Inventor: Gunther Schroeder, Sperberstr. 4, D-41564 Kaarst, Germany

[21] Appl. No.: 337,812

[22] Filed: Nov. 8, 1994

[30] Foreign Application Priority Data

Nov. 25, 1993 [DE] Germany ............ 43 40 134.1

[51] Int. Cl.⁶ .................................................. B23P 15/00
[52] U.S. Cl. .................. 492/38; 492/40; 29/895.212; 29/895.213
[58] Field of Search .......... 29/895.212, 895.21, 29/895.213; 492/38, 40; 228/164

[56] References Cited

U.S. PATENT DOCUMENTS

| | | | |
|---|---|---|---|
| 2,342,159 | 2/1944 | Moran | 29/895.21 |
| 3,432,902 | 3/1969 | Rackoff et al. | |
| 3,585,710 | 6/1971 | Wilder et al. | |
| 3,737,962 | 6/1973 | Hill | 29/123 |
| 3,787,942 | 1/1974 | Birdenagel et al. | 492/38 |
| 3,803,683 | 4/1974 | Oxlade | 492/40 |
| 3,807,012 | 4/1974 | Loquist | 29/895.212 |
| 3,833,982 | 9/1974 | Pauli | 492/40 |
| 4,112,564 | 9/1978 | Loqvist | |
| 4,208,147 | 6/1980 | Grege et al. | 492/40 |
| 4,961,261 | 10/1990 | Kojima et al. | 29/815.21 |

FOREIGN PATENT DOCUMENTS

| | | |
|---|---|---|
| 326079 | 11/1975 | Austria . |
| 0049771 | 9/1981 | European Pat. Off. . |
| 1045082 | 11/1953 | France . |
| 2536354 | 8/1975 | Germany . |
| 3730226 | 9/1987 | Germany . |
| 2704702 | 9/1988 | Germany . |
| 3002510 | 1/1985 | Japan ............ 492/40 |
| 318405 | 1/1991 | Japan . |

OTHER PUBLICATIONS

European Patent Office; Patent Abstracts of Japan; Pub. No. JP318405, published Jan. 28, 1991.

*Primary Examiner*—Irene Cuda
*Attorney, Agent, or Firm*—Myers, Liniak & Berenato

[57] ABSTRACT

A forming roll includes a base component having an angularly extending surface thereabout, a solder material applied to the surface and a wear ring on the solder and shaped to complement the angled surfaces of the base component. The Base component and the wear ring are made of materials with different thermal expansion coefficients so that when the parts are heated and then cooled a compressive strain results.

19 Claims, 1 Drawing Sheet

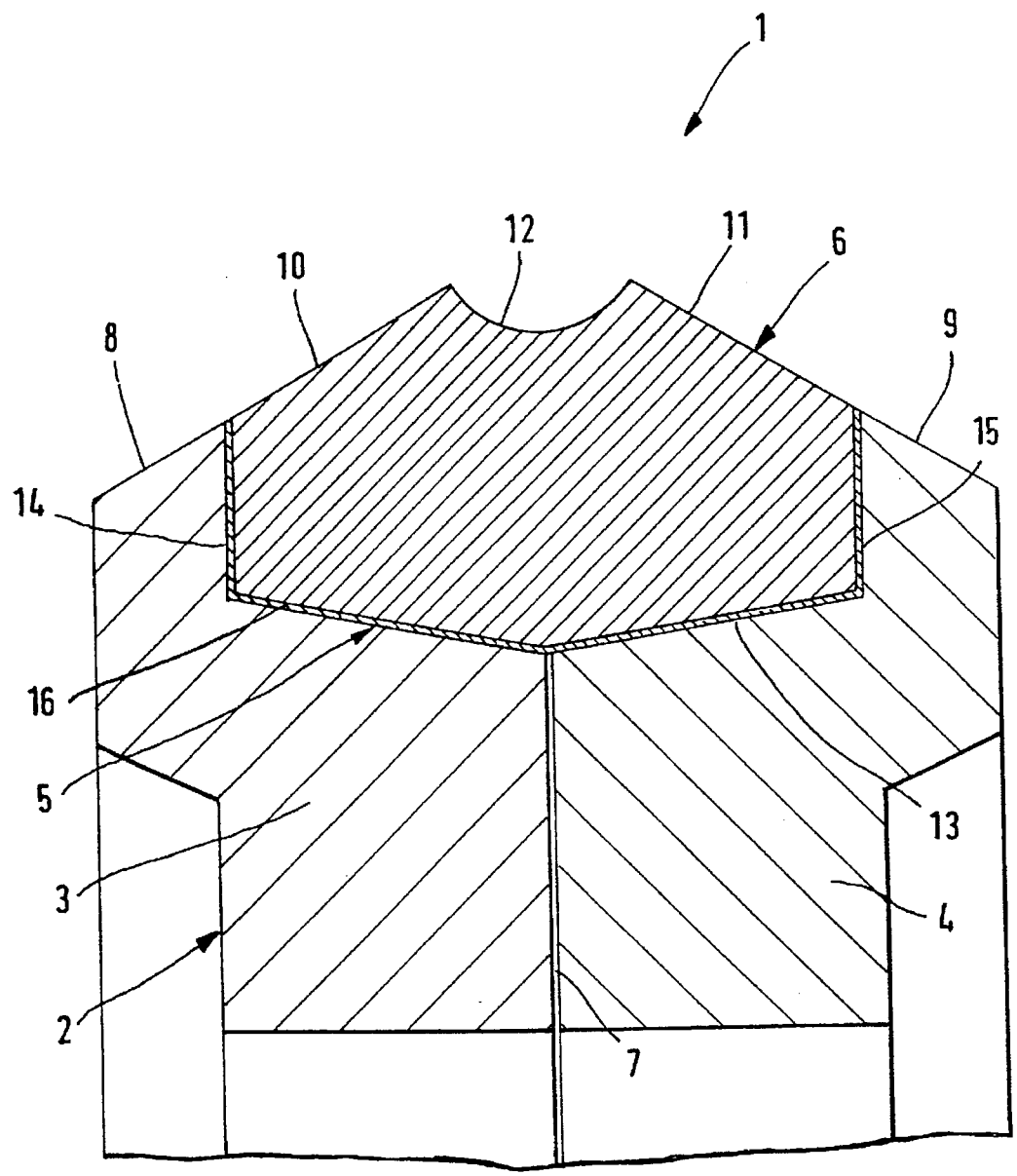

METAL PART AND PROCESS FOR ITS PRODUCTION

DESCRIPTION

The invention relates to a metal part, in particular a rolling ring, with a base and a wear ring, whereby the base consists of a material with a higher heat expansion coefficient and lower wear resistance than the material of the wear ring. The invention also relates to a process for the production of such a metal part, whereby a wear ring is produced and whereby a base is produced from a material with a higher heat expansion coefficient and lower wear resistance than the material of the wear ring, and whereby the wear ring is subsequently fixed to the base.

Metal parts with a design of the above mentioned type are used frequently. To improve wear resistance, they have a wear ring at the periphery consisting of a hard metal or metal carbide and thus having a higher wear resistance than the base that usually consists of cast iron or steel. Such metal parts are used e.g. in rolling mills in the form of reducing rolls, whereby several such reducing rolls are arranged opposite each other in a stretch-reducing mill.

The problem hereby is the connection between the base and the wear ring, as well as the sensitivity to tensile forces of the material usually used for wear rings. In one known solution, the base is constructed of two annular disks enclosing an annular groove along the periphery and which can be tightened against each other axially with screws. The wear ring is inserted into this annular groove. It is kept frictionally engaged by the tensile forces.

Based on the frictional engagement, the adhesion of the wear ring inside the annular groove is limited. In the past, the wear ring has slipped, resulting in friction heat on the clamping surfaces that resulting in a breaking of the wear ring. It has also been found that the wear ring blows off during blockages of the rolling mill.

Also known are metal parts of the initially mentioned type which are based on the concept of German Patent 27 04 702. Wear ring and base in this case are connected via a transition zone in which the hard metal of the wear ring is mixed with the graphite cast iron of the base. Costs for producing such a metal part are extremely high for several reasons. This is because a cast model must be produced for each dimension. In addition, an inordinately high amount of cast iron is needed for the production. Depending on the dimension, the waste also is near 50%. Because of the inevitable axial tensions occurring in this process, the wear ring tends to crack.

The invention is thus based on the task of designing a metal part of the initially mentioned type in such a manner that a good connection is ensured between wear ring and base and that the production costs are low. The invention is also based on the task of providing a process particularly suited to the production of such a metal part.

According to the invention, the first part of the task is solved in that the wear ring is connected to the base via a soldering joint, whereby wear ring and base are positioned relative to each other in such a manner that following the heating of the base and wear ring that is necessary for producing the soldering joint, shrinking forces directed radially inward are transmitted by the base via the soldering joint to the wear ring as a result of the cooling.

The basis of the invention is first the soldering joint between base and wear ring, whereby in particular solders with a high melting point are suitable, e.g. bronze and silver solders. This creates a very strong connection between base and wear ring. The risk of slippage, i.e. a relative movement between wear ring and base, does not exist. On the other hand, an essential element of the invention is the sizing of base and wear ring relative to each other in such a manner that during the cooling of the metal part after production of the soldering joint, shrinking forces directed radially inward are transmitted via this soldering joint to the wear ring. The fact that the base consists of a material, e.g. cast iron or steel, which is subject to a significantly greater shrinkage during cooling than the wear ring material is hereby exploited. This means that the wear ring does not shrink as much as the base, so that the shrinking forces transmitted to it via the soldering joint result in a compressive strain via the cross-section of the wear ring. This compressive strain resists influences which possibly could result in the development of tensile forces inside the wear ring. This means that the wear ring is protected against the dangerous tensile forces, i.e. does not have a tendency to break or crack.

According to a modification of the invention it is suggested that the base is divided into two base disks by a division plane extending through the closing ring, whereby these disks preferably have a distance relative to each other that is such that the base disks also do not contact each other during the heating to the temperature necessary for producing the soldering joint. The two base disks thus are practically connected to each other via the wear ring and do not hinder each other due to expansion during heating and shrinkage during cooling. It is preferred that the division plane extends through the center of the wear ring.

If the wear ring-as is actually known—sits inside an annular groove in the base, the annular groove should have a V-shaped groove bottom. In this way, axial pressure on both the base disks via the V-shaped groove bottom is able to generate radial pressure which presses the excess solder material from the soldering joint and ensures the necessary small soldering joint, thus resulting in a high stability of the solder connection, which is a condition for transmitting the radial shrinkage tensions to the wear ring. It is useful that hereby the groove bottom is located symmetrically to the division plane.

In order to create the largest possible connecting surface, the wear ring should be connected via the soldering joint over the full surface with all interior surfaces of the annular groove. But applications are conceivable in which the soldering joint extends only over the groove bottom of the annular groove.

Regarding the second part of the task, the process according to the invention is characterized in that solder material is applied at a connecting surface between base and wear ring, and that the metal part is after the putting together of the wear ring and base heated to a temperature necessary for producing a soldering joint and is then cooled again, whereby base and wear ring are sized in such a manner during production that the base develops such a radial shrinkage during the cooling of the metal part that shrinking forces directed radially inward are transmitted via the soldering joint to the wear ring.

According to the invention, the soldering joint thus is produced by heating wear ring and base, so that during cooling shrinkage forces can develop which then can be transmitted via the soldering joint to the wear ring that undergoes less shrinkage, and there result in the formation of pressure strains.

The soldering joint should be produced either under inert gas or in vacuum. It is hereby advantageous if at least the connecting surfaces of base and wear ring intended for the soldering joint are roughened, e.g. by sand blasting. Depending on the solder material and steel alloy for the base, it is possible to also use a smooth ground or lathed connecting surface. As already stated, the connection between wear ring and adjoining surfaces of the base should extend over the entire surface.

The drawing shows the invention in more detail using an embodiment. In a cross-section, it shows the top half of a reducing roll (1). The reducing roll (1) comprises a base (2) consisting of two laterally reversed formed base disks (3,4). The base (2) has an annular groove (5) along the periphery into which a wear ring (6) has been inserted.

The base disks (3,4) consist of steel or other metal with a heat expansion coefficient determined by the value of the tensile force necessary for the intended purpose after cooling, and are separated from each other through a center gap (7). Along the periphery, the base disks (3,4) have angled surfaces (8,9) which continue in corresponding angled surfaces (10,11) of the wear ring (6) and end in a central, here arc-shaped, roll groove (12).

The roll groove (12) and the roll grooves of the opposite reducing rolls form a passage inside the rolling mill for bar and pipe material, which is reduced in diameter and stretched during the passage according to the shape of the roll grooves (12) and their distance relative to each other.

The annular groove (5) has a V-shaped groove bottom (13) with an obtuse V-angle, whereby the annular groove (5) extends symmetrically to the center gap (7). The groove bottom (13) is adjoined by radially extending groove side walls (14,15).

The wear ring (6) is connected via a soldering joint (16) with the base disks (3,4). The soldering joint (16) extends over the full surface of the groove bottom (13) and groove side walls (14,15).

The reducing roll (1) is produced in that solder material is applied to the insides of the annular groove (5) or is placed into the groove, e.g. in the form of rolled, single or bimetallic, band-shaped solder material, or in the form of net-like perforated strips. The base disks (3,4) are then placed from both sides against the wear ring (6). The unit of base (2) and wear ring (6) formed in this manner is then placed into a furnace and heated there to 700° C. to 1,100° C., i.e., under vacuum or inert gas. The heating results in a greater radial expansion of the base (2) than the wear ring (6), so that the solder material is put under pressure and distributes itself well over the groove side walls (14,15). The soldering joint in the V-shaped groove bottom (13) is additionally reduced by axial pressure and the resulting radial pressure to a few 1/100ths to 1/10ths mm, whereby a high strength soldering joint (16) is created.

During the subsequent cooling of the reducing roll (1), the solder material hardens and thus produces a strong soldering joint (16) between base (2) and wear ring (6). Due to the higher heat expansion coefficient, the material of the base (2) shrinks more than the hard metal or metal carbide wear ring (6) during further cooling. The shrinkage forces that are oriented radially inward are transmitted via the soldering joint (16) to the wear ring (6) and then attempt to edge the wear ring (6) radially inward. This creates pressure strains in the cross-section of the wear ring (6). These pressure strains protect the wear ring (6) against the influence of tensile stresses that act on it during operation.

I claim:
1. A forming roll, comprising:
 a) a base component formed from a material having a first predetermined coefficient of thermal expansion, an angled surface extending about said base component;

b) a wear ring disposed about said base component, said wear ring formed from a material having a second predetermined coefficient of thermal expansion and said second coefficient being less than said first coefficient and said ring having a base sized and shaped to complement said angled surface; and c) a solder joint interconnects said base component and said wear ring, said solder joint transmitting radially inwardly directed shrinkage forces to said wear ring, generated by said base component as a result of cooling after heating said base component and said wear ring for producing said solder joint, creating compressive strain in the cross section of said wear ring.

2. The forming roll of claim 1, wherein:
 a) said solder joint is formed from a solder having a copper component.

3. The forming roll of claim 1, wherein:
 a) said base component is formed from first and second juxtaposed base disks defining there between a division plane.

4. The forming roll of claim 3, wherein:
 a) said disks are spaced apart.

5. The forming roll of claim 3, wherein:
 a) said division plane extends through the center of said wear ring.

6. The forming roll of claim 1, wherein:
 a) said angled surface is an annular groove formed in said base component, said groove having a V-shaped bottom; and
 b) said wear ring is received within said groove.

7. The forming roll of claim 6, wherein:
 a) said solder joint extends over the entirety of said annular groove.

8. The forming roll of claim 6, wherein:
 a) said wear ring base is a roll groove formed in a surface thereof disposed opposite to the surface confronting said bottom.

9. The forming roll of claim 6, wherein:
 a) said groove is disposed symmetrically relative to the center of said base component.

10. The forming roll of claim 1, wherein:
 a) said base component is a roll formed from a material chosen from the group consisting of cast iron and steel; and
 b) said wear ring is formed from a material chosen from the group consisting of hard metal and metal carbide.

11. Process for the production of a forming roll, comprising the steps of:
 a) providing a base component formed from a material having a first predetermined coefficient of thermal expansion, the base component having an angularly extending surface thereabout;
 b) applying a solder material about the base component over the angularly extending surface;
 c) providing a wear ring formed from a material having a second predetermined coefficient of thermal expansion and having wear resistance in excess of the wear resistance of the material forming said base component, said second coefficient being less than said first coefficient and the ring having a base sized and shaped to complement the angularly extending surface;
 d) forming an assembly by mounting said ring about the base component so that the solder material is disposed therebetween and the base complements the angularly extending surface;

e) heating the assembly to a temperature sufficient to melt the solder material; and f) cooling the assembly and thereby forming a solder joint connecting the base component and the ring, the solder joint transmitting radially inwardly directed shrinkage forces to the ring, generated by the base component as a result of cooling after the heating step for forming the solder joint, creating compressive strain in the cross section of the wear ring.

12. The process of claim 11, including the step of:

a) forming the solder joint under the influence of a vacuum or in the presence of an inert gas.

13. The process of claim 11, including the step of:

a) roughening the angularly extending surface prior to applying the solder material thereto, and roughening the base of the wear ring prior to mounting the wear ring about the base component.

14. The process of claim 12, including the step of:

a) providing sufficient solder material to form a solder joint between all confronting surfaces of the base component and the wear ring.

15. The process of claim 12, including the step of:

a) providing a solder material having a copper component.

16. The process of claim 15, including the step of:

a) providing the solder material from the group consisting of rolled solder, single and bi-metallic solder, band-shaped solder, and net-like perforated strip solder.

17. The process of claim 11, including the steps of:

a) providing a base component formed from a material chosen from the group consisting of cast iron and steel; and b) providing a wear ring formed from a material chosen from the group consisting of hard metal and metal carbide.

18. The process of claim 17, including the steps of:

a) providing as the base component a roll having an annular groove with a V-shaped bottom;

b) positioning the solder material in the groove in overlying relation to the bottom; and c) positioning the wear ring in the groove in overlying relation to the solder material.

19. The process of claim 18, including the step of:

a) providing a wear ring having a roll groove forming the base.

* * * * *